United States Patent
Sakaue (10) Patent No.: US 11,757,608 B2
(45) Date of Patent: Sep. 12, 2023

(54) COMMUNICATION APPARATUS, COMMUNICATION SYSTEM, COMMUNICATION METHOD, AND COMPUTER READABLE MEDIUM

(71) Applicant: MITSUBISHI ELECTRIC CORPORATION, Tokyo (JP)

(72) Inventor: Taichi Sakaue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 302 days.

(21) Appl. No.: 17/160,002

(22) Filed: Jan. 27, 2021

(65) Prior Publication Data

US 2021/0152323 A1    May 20, 2021

Related U.S. Application Data (63) Continuation of application No. PCT/JP2018/035173, filed on Sep. 21, 2018.

(51) Int. Cl.
*H04L 7/00* (2006.01)

(52) U.S. Cl.
CPC .................. *H04L 7/0008* (2013.01)

(58) Field of Classification Search
CPC ........ H04L 7/0008; H04L 12/28; H04L 29/08
See application file for complete search history.

(56) References Cited

U.S. PATENT DOCUMENTS

| 10,284,692 B2 | 5/2019 | Ichimura et al. |
| 10,820,288 B2 * | 10/2020 | Li ..................... H04W 56/004 |
| 2010/0098202 A1 | 4/2010 | Lai et al. |
| 2010/0198363 A1 | 8/2010 | Yajima et al. |

(Continued)

FOREIGN PATENT DOCUMENTS

| CN | 105634636 A | 6/2016 |
| JP | 6-21955 A | 1/1994 |

(Continued)

OTHER PUBLICATIONS

U.S. Office Action for U.S. Appl. No. 17/159,894, dated Oct. 17, 2022.

(Continued)

*Primary Examiner* — Jamal Javaid
(74) *Attorney, Agent, or Firm* — Birch, Stewart, Kolasch & Birch, LLP (57) ABSTRACT

A communication system (500) has a plurality of communication apparatuses (100). A management verification unit (110) verifies whether or not a communication apparatus (100) is a network management master. A grandmaster verification unit (120) verifies whether or not the communication apparatus (100) is a grandmaster. When the communication apparatus (100) is the network management master and the grandmaster, a setting unit (130) sets in an apparatus priority (21) a threshold (23) indicating that a priority is higher than a priority of a current grandmaster. When the communication apparatus (100) is the network management master and not the grandmaster, the setting unit (130) transmits a network setting message that includes the threshold (23) to be set for a priority of another communication apparatus that is the grandmaster.

9 Claims, 7 Drawing Sheets

(56) References Cited

U.S. PATENT DOCUMENTS

| | | |
|---|---|---|
| 2013/0215910 A1 | 8/2013 | Inomata |
| 2014/0028875 A1 | 1/2014 | Hara |
| 2014/0098706 A1 | 4/2014 | Maruyama et al. |
| 2016/0013876 A1 | 1/2016 | Zhang et al. |
| 2016/0149692 A1 | 5/2016 | Kim et al. |
| 2017/0078038 A1 | 3/2017 | Tashiro et al. |
| 2018/0062780 A1 | 3/2018 | Shimizu et al. |

FOREIGN PATENT DOCUMENTS

| | | |
|---|---|---|
| JP | 2006-310964 A | 11/2006 |
| JP | 2010-182103 A | 8/2010 |
| JP | 2012-114815 A | 6/2012 |
| JP | 2013-85278 A | 5/2013 |
| JP | 2013-108895 A | 6/2013 |
| JP | 2014-78781 A | 5/2014 |
| JP | 2015-12400 A | 1/2015 |
| JP | 2015-177275 A | 10/2015 |
| JP | 2015-179999 A | 10/2015 |
| JP | 2018-37885 A | 3/2018 |

OTHER PUBLICATIONS

"IEEE Standard for a Precision Clock Synchronization Protocol for Networked Measurement and Control Systems", IEEE Std 1588™—2008, total 289 pages.

"Timing and Synchronization for Time-Sensitive Applications in Bridged Local Area Networks", IEEE Std 802.1AS™—2011, total 292 pages.

International Search Report for PCT/JP2018/035172 dated Dec. 4, 2018.

International Search Report for PCT/JP2018/035173 dated Dec. 4, 2018.

International Search Report for PCT/JP2018/035174 dated Dec. 4, 2018.

U.S. Office Action for U.S. Appl. No. 17/159,703, dated Dec. 15. 2021.

* cited by examiner

COMMUNICATION APPARATUS, COMMUNICATION SYSTEM, COMMUNICATION METHOD, AND COMPUTER READABLE MEDIUM

CROSS REFERENCE TO RELATED APPLICATIONS

This application is a Continuation of PCT International Application No. PCT/JP2018/035173, filed on Sep. 21, 2018, all of which is hereby expressly incorporated by reference into the present application.

TECHNICAL FIELD

The present invention relates to a communication apparatus, a communication system, a communication method, and a communication program. The present invention relates especially to a communication apparatus, a communication system, a communication method, and a communication program that perform time synchronization on a master-slave system.

BACKGROUND ART

There are standards regarding time synchronization technology such as IEEE1588 or IEEE802.1AS that synchronizes distributed clocks in a network on a master-slave system that is configured of a plurality of nodes. In these standards, a grandmaster which is to be a standard of time is selected based on a Best Master Clock Algorithm (BMCA), and a slave that synchronizes with the grandmaster synchronizes with time delivered from the grandmaster. When a node with a higher priority than a priority of the grandmaster newly enters a system that is running, each node performs mediation to select the grandmaster, and recognizes the node with a high priority that has newly entered as the grandmaster. And, each node synchronizes with the node with the high priority that has newly entered. At this time, there is a case where a switch in grandmasters that is unintentional occurs. A process for a selection of a grandmaster by mediation is called "grandmaster mediation".

In the technology of Patent Literature 1, a network connection device is provided between a grandmaster and a slave node. And, in the technology of Patent Literature 1, a new node is connected to the network connection device, and when a best timing synchronization request is sent from the new node, the network connection device blocks the best timing synchronization request.

CITATION LIST

Patent Literature

Patent Literature 1: JP 2013-085278 A

SUMMARY OF INVENTION

Technical Problem

In Patent Literature 1, a switch in grandmasters that is unintentional can be prevented. There is, however, an issue where even when a communication apparatus with a high priority and high accuracy enters a communication system, there is a risk where time synchronization cannot be done with the communication apparatus with high accuracy.

The present invention aims to, when a communication apparatus with high priority enters, enable synchronization with the communication apparatus while preventing a switch in grandmasters that is unintentional.

Solution to Problem

A communication apparatus according to the present invention is a communication apparatus included in a communication system, the communication system having a plurality of communication apparatuses, where a communication apparatus of any of the plurality of communication apparatuses is set as a grandmaster that is to be a standard of time of the plurality of communication apparatuses, and a communication apparatus of any of the plurality of communication apparatuses is set as a network management master that sets a priority of the grandmaster. The communication apparatus includes:

a management verification unit to verify whether or not the communication apparatus is the network management master;

a grandmaster verification unit to verify whether or not the communication apparatus is the grandmaster; and a setting unit, when the communication apparatus is the network management master and the grandmaster, to set in a priority of the communication apparatus a threshold indicating that a priority is higher than a priority of a current grandmaster, and when the communication apparatus is the network management master and not the grandmaster, to transmit a network setting message that includes the threshold to be set for a priority of another communication apparatus that is the grandmaster.

Advantageous Effects of Invention

According to the communication apparatus of the present invention, an effect is provided where when a communication apparatus with a high priority enters, to enable synchronization with the communication apparatus while preventing a switch in grandmasters that is unintentional.

DESCRIPTION OF EMBODIMENTS

An embodiment of the present invention will be described hereinafter using the drawings. Throughout the drawings,

Embodiment 1

Figure 1:
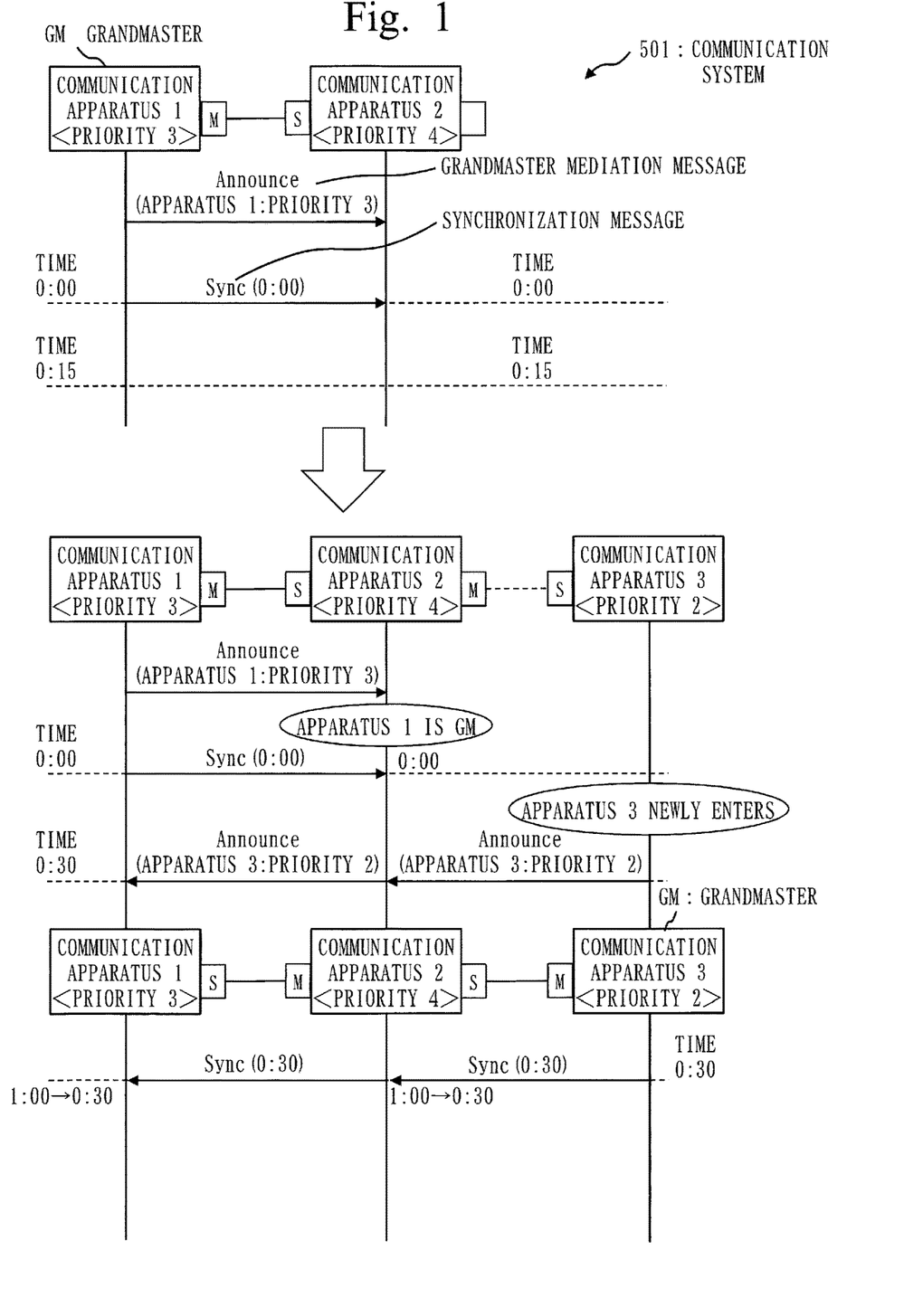
FIG. 1 is a sequence diagram of a communication system to compare with a communication system according to Embodiment 1.

FIG. 1 is a diagram illustrating operation sequences of a communication system 501 to compare with a communication system according to the present embodiment.

The communication system 501 in FIG. 1 and the communication system according to the present embodiment have adopted a standard regarding time synchronization technology such as IEEE1588 or IEEE802.1AS. In these standards a grandmaster is selected by grandmaster mediation using a BMCA, and a slave other than the grandmaster synchronizes with time delivered from the grandmaster.

In the operation sequence in an upper tier in FIG. 1, the communication system 501 includes a communication apparatus 1 of priority 3 and a communication apparatus 2 of priority 4. The communication apparatus 1 is a grandmaster GM that is to be a standard of time of the communication system 501. A grandmaster mediation message Announce is transmitted to the communication apparatus 2 from the communication apparatus 1, and then, a synchronization message Sync is transmitted. As a result, time synchronization of the communication apparatus 1 and the communication apparatus 2 is completed. Hereinafter, there are cases where the grandmaster mediation message Announce is described simply as Announce. There are cases where the synchronization message Sync is described simply as Sync.

The Announce is a frame for performing the grandmaster mediation. The Sync is a frame sent from the grandmaster and is for performing time synchronization of the communication system. In the upper tier in FIG. 1, it is illustrated that the grandmaster mediation is completed, and that the time synchronization has been performed between the communication apparatus 1 and the communication apparatus 2. "M" represents MasterPort. MasterPort is a port that transmits the Announce and the Sync. "S" represents SlavePort. SlavePort is a port that receives the Sync. Here, a value of priority indicates that the smaller the value of priority, the higher a priority is to be the grandmaster.

In the operation sequence in a lower tier in FIG. 1, in a state where the grandmaster mediation of the communication apparatus 1 and the communication apparatus 2 has been completed, a state where a communication apparatus 3 newly enters the communication system 501 is illustrated. The communication apparatus 3 that has newly entered transmits an Announce indicating that priority 2 of the communication apparatus 3 is higher than priority 3 of the communication apparatus 2 that is the grandmaster, and starts the grandmaster mediation. When the grandmaster mediation is completed, the communication apparatus 3 transmits a Sync to make time of the communication apparatus 2 synchronize with time of the communication apparatus 3. At this time, when a switch in the grandmasters is a switch that is unintentional, the communication apparatus 2 can prevent the switch by blocking the Announce of the communication apparatus 3 or by a technique of ignoring. By such a technique, however, even when the communication apparatus 3 is much higher in priority and has higher accuracy than the communication apparatus 2, the communication apparatus 3 cannot be made the grandmaster.

In the present embodiment, an aspect of a communication system that can make the communication apparatus 3 the grandmaster when the communication apparatus 3 is much higher in priority and has higher accuracy than the communication apparatus 2, will be described.

A method to conclude that a communication apparatus is already synchronized with the grandmaster is as follows. When the communication apparatus is a slave, the communication apparatus has SlavePort. When SlavePort is not changed for more than or equal to a certain amount of time, the communication apparatus concludes that the communication apparatus has synchronized with the grandmaster at least once.

When the communication apparatus is the grandmaster, a method to conclude that the communication apparatus is already synchronized with the communication apparatus which is the slave is as follows. When the Announce is not received from MasterPort for more than or equal to a certain amount of time, the communication apparatus concludes that the BMCA has ended and the slave is synchronized.

\*\*\*Description of Configuration\*\*\*

A configuration of a communication apparatus 100 according to the present embodiment will be described using FIG. 2.

First, a communication system 500 according to the present embodiment includes a plurality of communication apparatuses 100. In the communication system 500, a communication apparatus of any of a plurality of communication apparatuses is set as the grandmaster that is to be a standard of time of the plurality of communication apparatuses. A communication apparatus of any of the plurality of communication apparatuses is set as a network management master that sets a priority of the grandmaster.

The communication apparatus 100 is a computer. The communication apparatus 100 includes a processor 910 and other hardware such as a memory 921, an auxiliary storage device 922, an input interface 930, an output interface 940, and a communication control unit 950. Furthermore, the communication apparatus 100 includes hardware such as network ports 961 and 962, and a system clock 970. The processor 910 is connected to other hardware via signal lines, and controls these other hardware. Although the network ports 961 and 962, and the system clock 970 are not illustrated, the network ports 961 and 962, and the system clock 970 will be described using FIG. 3 to be described later.

The communication apparatus 100 includes, as functional elements, a management verification unit 110, a grandmaster verification unit 120, a setting unit 130, and a mediation unit 140. An apparatus priority 21, a grandmaster priority 22, and a threshold 23 are stored in the memory 921.

Functions of the management verification unit 110, the grandmaster verification unit 120, the setting unit 130, and the mediation unit 140 are realized by software.

The processor 910 is a device that executes a communication program. The communication program is a program that realizes the functions of the management verification unit 110, the grandmaster verification unit 120, the setting unit 130, and the mediation unit 140.

The processor 910 is an IC (Integrated Circuit) that performs a calculation process. Specific examples of the processor 910 are a CPU (Central Processing Unit), a DSP (Digital Signal Processor), and a GPU (Graphics Processing Unit).

The memory 921 is a storage device that stores data temporarily. A specific example of the memory 921 is an SRAM (Static Random Access Memory) or a DRAM (Dynamic Random Access Memory).

The auxiliary storage device 922 is a storage device that stores data. A specific example of the auxiliary storage device 922 is an HDD. The auxiliary storage device 922 may be a portable storage medium such as an SD (registered trademark) memory card, a CF, a NAND flash, a flexible disc, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port connected to an input device such as a mouse, a keyboard, or a touch panel. The input interface 930 is, specifically, a USB (Universal Serial Bus) terminal. The input interface 930 may be a port connected to a LAN (Local Area Network).

The output interface 940 is a port to which a cable of an output device such as a display is connected. The output interface 940 is, specifically, a USB terminal or an HDMI (registered trademark) (High Definition Multimedia Interface) terminal. The display is, specifically, an LCD (Liquid Crystal Display).

The communication program is read into the processor 910 and executed by the processor 910. Not only the communication program but also an OS (Operating System) is stored in the memory 921. The processor 910 executes the communication program while executing the OS. The communication program and the OS may be stored in the auxiliary storage device 922. The communication program and the OS stored in the auxiliary storage device 922 are loaded into the memory 921 and executed by the processor 910. A part or all of the communication program may be built into the OS.

The communication apparatus 100 may include a plurality of processors that replace the processor 910. These plurality of processors share execution of the communication program. Each processor is, as with the processor 910, a device that executes the communication program.

Data, information, signal values, and variable values used, processed, or outputted by the communication program are stored in the memory 921, the auxiliary storage device 922, or a register or a cache memory in the processor 910.

"Unit" of each unit of the management verification unit 110, the grandmaster verification unit 120, the setting unit 130, and the mediation unit 140 may be replaced with "process", "procedure", or "step". "Process" of a management verification process, a grandmaster verification process, a setting process, and a mediation process may be replaced with "program", "program product", or "computer-readable storage medium having recorded a program".

The communication program makes a computer execute each process, each procedure, or each step being "process", "procedure", or "step" with which "unit" of each unit described above is replaced. A communication method is a method performed by the communication apparatus 100 executing the communication program.

The communication program may be provided being stored in a computer-readable storage medium. The communication program may be provided as a program product.

Figure 2:
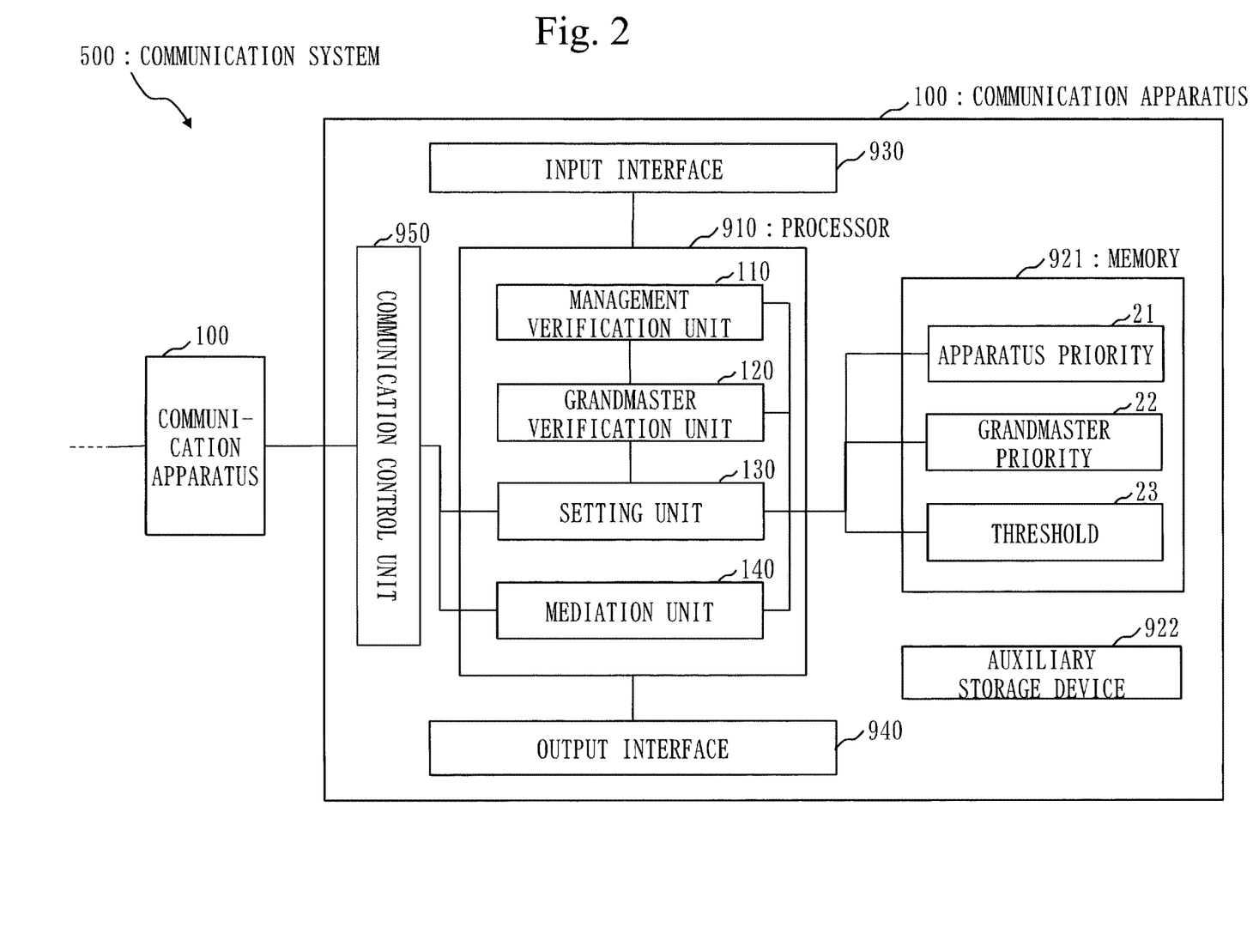
FIG. 2 is a configuration diagram of a communication apparatus according to Embodiment 1.
Figure 3:
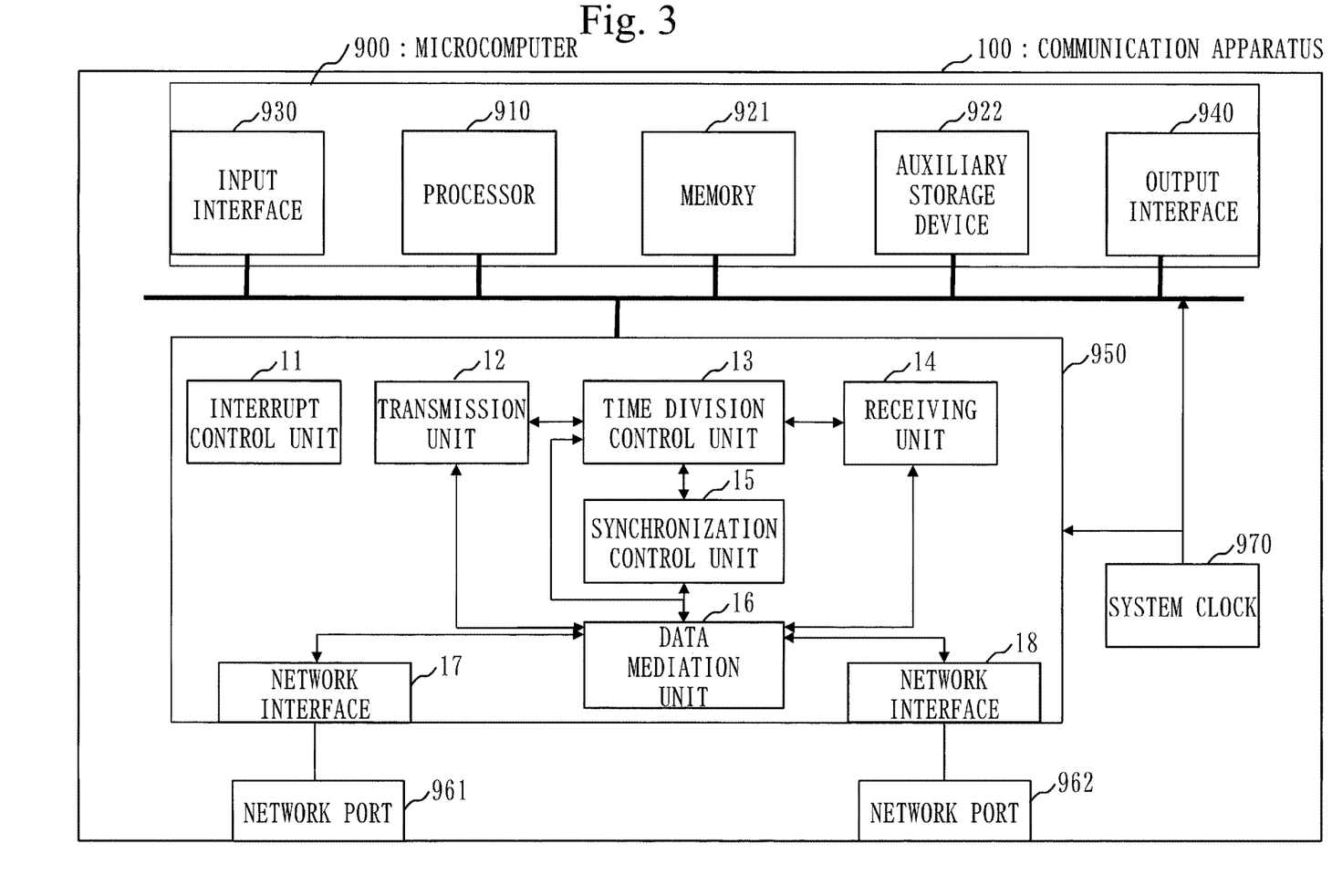
FIG. 3 is a detailed configuration diagram of hardware of the communication apparatus according to Embodiment 1.

FIG. 3 is a diagram illustrating a detailed configuration of hardware of the communication apparatus 100 according to the present embodiment. The hardware described in FIG. 2 will be described in more detail using FIG. 3.

The processor 910, the memory 921, the auxiliary storage device 922, the input interface 930, and the output interface 940 are included in a microcomputer 900.

The communication control unit 950 includes an interrupt control unit 11, a transmission unit 12, a time division control unit 13, a receiving unit 14, a synchronization control unit 15, a data mediation unit 16, and network interfaces 17 and 18. The network interface 17 is connected to the network port 961. The network interface 18 is connected to the network port 962.

The interrupt control unit 11 performs outputting of an interrupt to the processor 910 and mask control of an interrupt.

The transmission unit 12 performs generation of a communication frame. Timing is inputted to the transmission unit 12 by the time division control unit 13, and the transmission unit 12 performs control of a start of transmission.

The time division control unit 13 performs control of a communication cycle and a time slot based on time inputted by the synchronization control unit 15.

The receiving unit 14 performs a receiving process of a frame. The receiving unit 14 extracts time information from a synchronization frame, that is, a synchronization message.

The synchronization control unit 15 outputs a time counter value to the time division control unit 13. The synchronization control unit 15 performs retaining of transmission time and receiving time of the synchronization frame.

The data mediation unit 16 performs transmission mediation of the communication frame. The data mediation unit 16 performs relay control based on time slot information inputted by the time division control unit 13. The data mediation unit 16 performs verification of type of the frame received. The data mediation unit 16 notifies the synchronization control unit 15 of receiving and transmission of the synchronization frame.

The network interfaces 17 and 18 notify the synchronization control unit 15 of the transmission and the receiving of the synchronization frame. The network interfaces 17 and 18 forward to the network ports 961 and 962, a frame to transmit. The network interfaces 17 and 18 forward the frame received from the network ports 961 and 962 to the data mediation unit 16.

The network ports 961 and 962 are physical ports that are connected to a network.

The system clock 970 inputs a clock signal into the communication control unit 950 and an internal bus by an oscillator.

*Description of Functions*

The management verification unit 110 verifies whether or not the communication apparatus 100 is the network management master. The network management master is a master apparatus that sets a priority of the grandmaster in the communication system 500.

The grandmaster verification unit 120 verifies whether or not the communication apparatus 100 is the grandmaster. The grandmaster is the master apparatus that is to be the standard of time of the plurality of communication apparatuses in the communication system 500.

When the communication apparatus 100 is the network management master and the grandmaster, the setting unit 130 sets in the apparatus priority 21 the threshold 23 indicating that a priority is higher than a priority of a current grandmaster. When the communication apparatus 100 is the network management master and not the grandmaster, the setting unit 130 transmits a network setting message that includes the threshold 23 to be set for a priority of another communication apparatus that is the grandmaster.

Set in the apparatus priority 21 is the priority of itself, itself being the communication apparatus 100.

The priority of the grandmaster in the communication system 500 is set in the grandmaster priority 22. In IEEE1588 or IEEE802.1AS, the grandmaster priority 22 is represented in a parameter of Priority 1.

The mediation unit 140 performs the grandmaster mediation by transmitting and receiving a grandmaster mediation message for selecting the grandmaster. The grandmaster mediation message is a message that includes a priority of a communication apparatus that is to be a candidate for the grandmaster in the communication system 500. While transmitting and receiving the grandmaster mediation message, the mediation unit 140 executes a grandmaster priority comparison process that compares priorities of the plurality of communication apparatuses, and performs the grandmaster mediation.

*Description of Operation*

Figure 4:
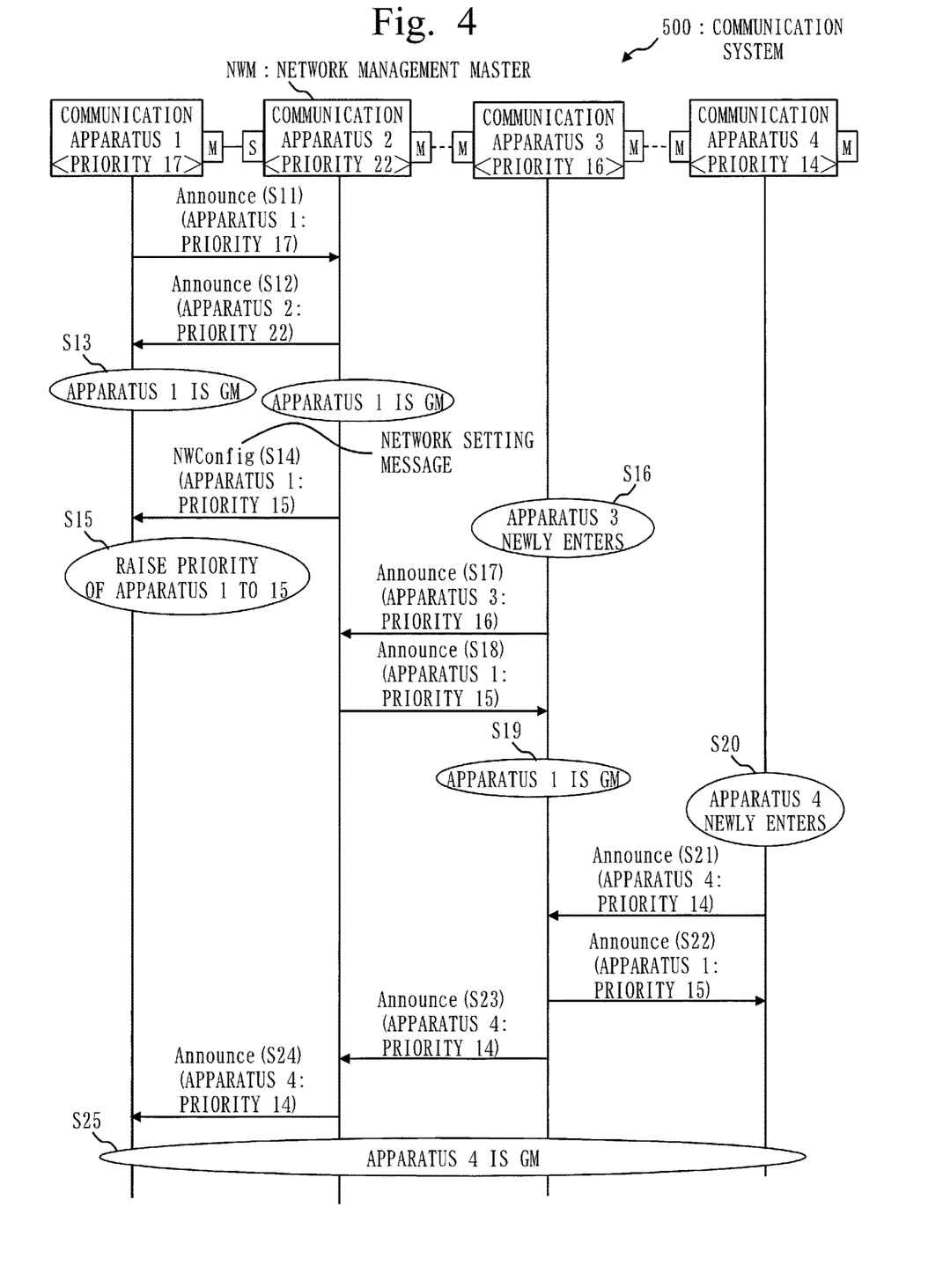
FIG. 4 is a sequence diagram of the communication system according to Embodiment 1.

FIG. 4 is a diagram illustrating an operation sequence of the communication system 500 according to the present embodiment. Operation of the communication system 500 according to the present embodiment will be described using FIG. 4.

In FIG. 4, the communication system 500 includes the plurality of communication apparatuses 100. The plurality of communication apparatuses 100 are the communication apparatus 1, the communication apparatus 2, the communication apparatus 3, and a communication apparatus 4. The communication apparatus 3 and the communication apparatus 4 newly enter the communication system 500.

In FIG. 4, the communication apparatus 2 is set first as a network management master NWM. Assume that a priority of the communication apparatus 1 is 17 and the priority of the communication apparatus 2 that is the network management master is 22. Assume that in the communication apparatus 2 that is the network management master, priority 15 is set as the threshold 23. The threshold 23 is retained only by the network management master. How to determine a value to be set as the threshold 23 is system dependent, and for example, an appropriate value is determined by a system designer. The threshold 23 is set in the network management master by using a system such as an engineering tool. As described above, the threshold 23 is stored beforehand in the memory 921 of the network management master.

In step S11, the Announce is transmitted as the grandmaster mediation message from the communication apparatus 1. The grandmaster mediation message is a message used for selecting the grandmaster. A priority of a communication apparatus that is to be a candidate for the grandmaster is included as a parameter in the grandmaster mediation message. Here, priority 17 of the communication apparatus 1 is set in the Announce. Next, in step S12, the Announce is transmitted from the communication apparatus 2 as the grandmaster mediation message. Here, priority 22 of the communication apparatus 2 is set in the Announce. As described above, the grandmaster mediation is executed by transmitting and receiving the grandmaster mediation message between the communication apparatus 1 and the communication apparatus 2. In step S13, the grandmaster mediation is completed, and the communication apparatus 1 is set as the grandmaster GM.

In step S14, since the communication apparatus 2 is the network management master, the communication apparatus 2 transmits a network setting message NWConfig. Hereinafter, there are cases where the network setting message NWConfig is described simply as NWConfig. The network setting message includes a threshold that is to be set in a priority of another communication apparatus that is the grandmaster. Here, in the NWConfig, information that a value of the threshold, 15, is to be set for the priority of the communication apparatus 1 that is the grandmaster, is included. The threshold is a value indicating that a priority is higher than the priority of the current grandmaster. Specifically, 15 that is higher in priority than the priority 17 of the current grandmaster is included in the NWConfig.

In step S15, the priority of the communication apparatus 1 is raised from 17 to 15.

In step S16, the communication apparatus 3 newly enters. The priority of the communication apparatus 3 is 16. In step S17 and step S18, the grandmaster mediation message is transmitted and received in the same manner as in step S11 and step S12. Since the priority of the communication apparatus 3 is 16 and the priority of the communication apparatus 1 that is the grandmaster is 15, the grandmaster is still the communication apparatus 1 in step S19.

In step S20, the communication apparatus 4 newly enters. A priority of the communication apparatus 4 is 14. In step S21 and step S22, the grandmaster mediation message is transmitted and received in the same manner as in step S17 and step S18. The priority of the communication apparatus 4 is 14 and the priority of the communication apparatus 1 that is the grandmaster is 15. Consequently, in step S23, the Announce is transmitted as the grandmaster mediation message from the communication apparatus 3. Furthermore, in step S24, the Announce is transmitted as the grandmaster mediation message from the communication apparatus 2. Here, priority 14 of the communication apparatus 4 is set in the Announce. By the grandmaster mediation as described above, in step S25, the communication apparatus 4 is set as the grandmaster.

As described above, in the communication system 500 according to the present embodiment, the network management master raises the priority of the grandmaster of the communication apparatus that became the grandmaster to the threshold by using the network setting message. As a result, even when a communication apparatus with a priority lower than the threshold enters the communication system, the grandmaster switching to the communication apparatus can be prevented. On the other hand, when a communication apparatus with a priority higher than or equal to the threshold enters the communication system, the grandmaster switches to the communication apparatus.

Next, operation of the communication apparatus 100 according to the present embodiment will be described.

Figure 5:
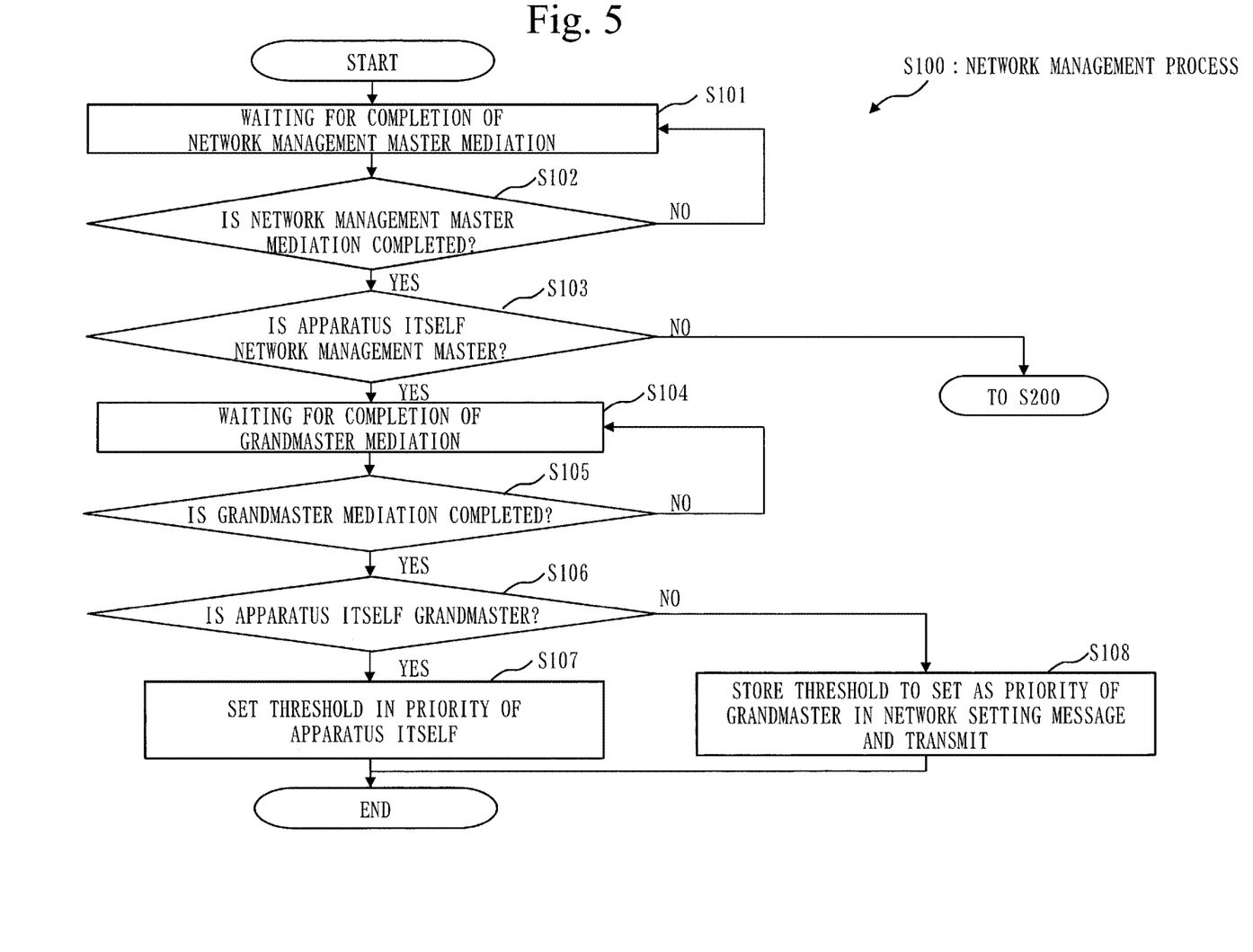
FIG. 5 is an operation flow diagram of the communication apparatus that is a network management master according to Embodiment 1.

FIG. 5 is an operation flow diagram of the communication apparatus 100 that is the network management master according to the present embodiment. A network management process S100 when the communication apparatus 100 is the network management master will be described using FIG. 5.

In step S101 and step S102, the communication apparatus 100 enters a waiting state until network management master mediation is completed. The network management master mediation is a process that determines the network management master in the communication system 500.

Here, a determination method of the network management master is discretionary. Specifically, there are determination methods as follows.

(1) The network management master mediation is executed between the communication apparatuses that are candidates for the network management master.

(2) A management master mediation message is exchanged between the communication apparatuses, and a communication apparatus with the priority stored in the management master mediation message that is highest becomes the network management master.

In step S103, the management verification unit 110 of the communication apparatus 100 verifies whether or not the communication apparatus 100 is the network management master. Specifically, the management verification unit 110 verifies whether or not the communication apparatus 100 is the network management master based on a result of the network management master mediation. When the communication apparatus 100 is the network management master, the process proceeds to step S104. When the communication apparatus 100 is not the network management master, the process proceeds to a network slave process S200.

In step S104 and step S105, the communication apparatus 100 enters a waiting state until the grandmaster mediation is completed. The grandmaster mediation is a process that determines the grandmaster in the communication system 500.

Figure 6:
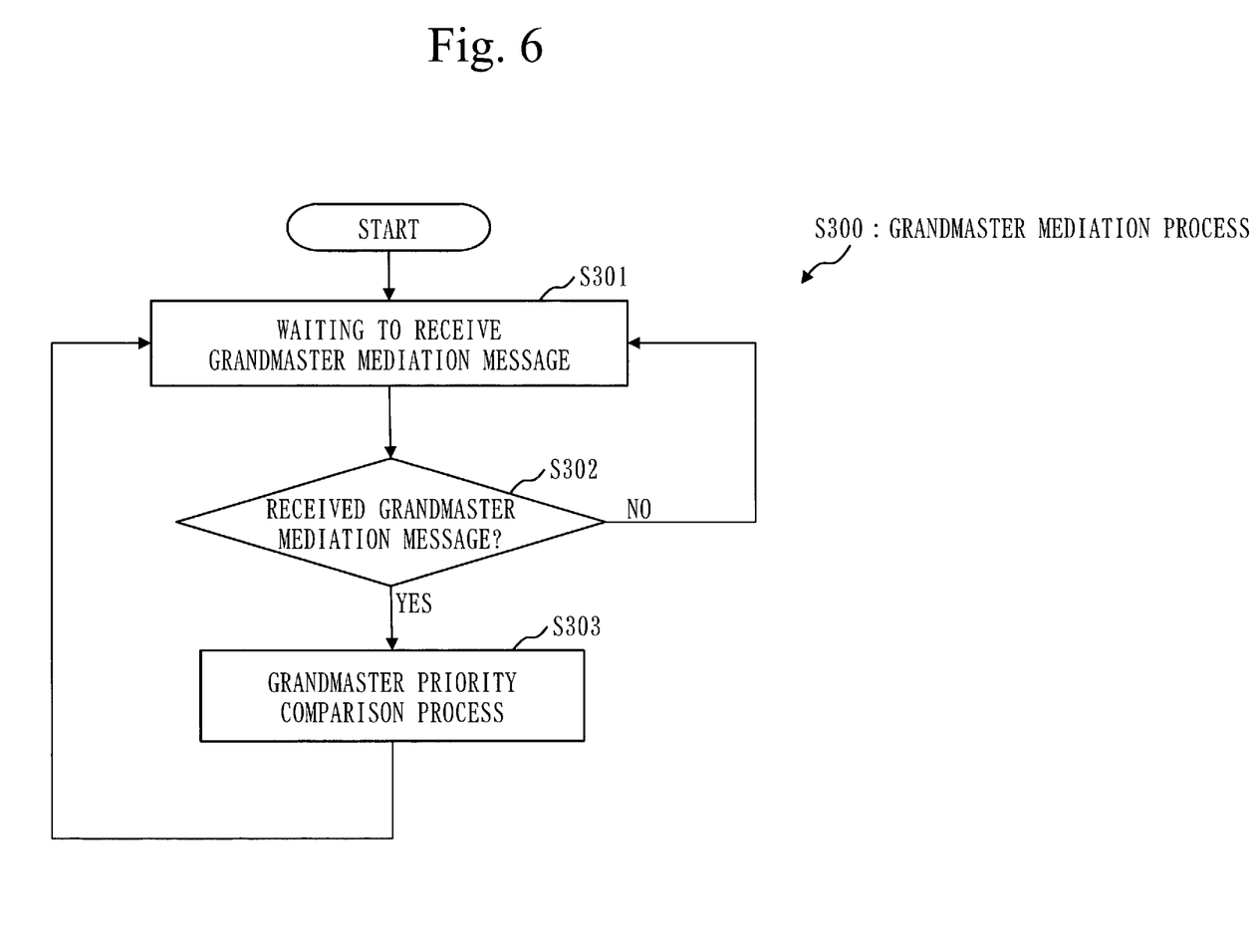
FIG. 6 is an operation flow diagram of the communication apparatus when receiving a grandmaster mediation message according to Embodiment 1.

FIG. 6 is an operation flow diagram of the communication apparatus 100 when receiving the grandmaster mediation message according to the present embodiment. A grandmaster mediation process S300 will be described using FIG. 6.

The communication apparatus 100 stores in the memory 921, the priority of the communication apparatus 100 as the apparatus priority 21, and stores in the memory 921, the priority of the grandmaster as the grandmaster priority 22.

When the grandmaster mediation message is received, the mediation unit 140 performs the grandmaster mediation by executing the grandmaster priority comparison process that compares the priority included the grandmaster mediation message with the grandmaster priority 22.

In step S301 and step S302, the mediation unit 140 enters a waiting state until the grandmaster mediation message is received.

In step S303, the mediation unit 140 performs the grandmaster priority comparison process when receiving the grandmaster mediation message. Specifically, the mediation unit 140 compares the priority included in the grandmaster mediation message with the grandmaster priority 22 of the memory 921, and performs the grandmaster mediation. The grandmaster priority comparison process is executed by a method specified by IEEE802.1AS or IEEE1588. When the grandmaster priority comparison process ends, the process returns to step S301.

Next, the description will continue by returning to FIG. 5.

In step S106, the grandmaster verification unit 120 verifies whether or not the communication apparatus 100 is the grandmaster. Specifically, the grandmaster verification unit 120 verifies whether or not the communication apparatus 100 is the grandmaster based on a result of the grandmaster mediation. When the communication apparatus 100 is the grandmaster, the process proceeds to step S107. When the communication apparatus 100 is not the grandmaster, the process proceeds to a network slave process S108.

Step S107 is a process when the communication apparatus 100 is the network management master and the grandmaster. At this time, the setting unit 130 sets in the apparatus priority 21 that is a priority of the communication apparatus 100, the threshold 23 indicating that a priority is higher than the priority of the current grandmaster. Specifically, the setting unit 130 sets the threshold 23 in the apparatus priority 21 where the priority of the communication apparatus 100 is set.

Step S108 is a process when the communication apparatus 100 is the network management master and not the grandmaster. At this time, the setting unit 130 transmits the network setting message including the threshold 23 to be set in a priority of another communication apparatus that is the grandmaster. Specifically, the setting unit 130 reads the threshold 23 from the memory 921. The setting unit 130 sets the threshold 23 read from the memory 921 in the network setting message and transmits the network setting message to the grandmaster. In the example in FIG. 4, the communication apparatus 2 is the network management master and is a communication apparatus that is not the grandmaster. Consequently, in step S14 in FIG. 4, the setting unit 130 of the communication apparatus 2 sets in the network setting message NWConfig, 15 as the priority of the grandmaster, and is transmitting the network setting message NWConfig to the communication apparatus 1 that is the grandmaster.

With the above, the network management process S100 ends.

Figure 7:
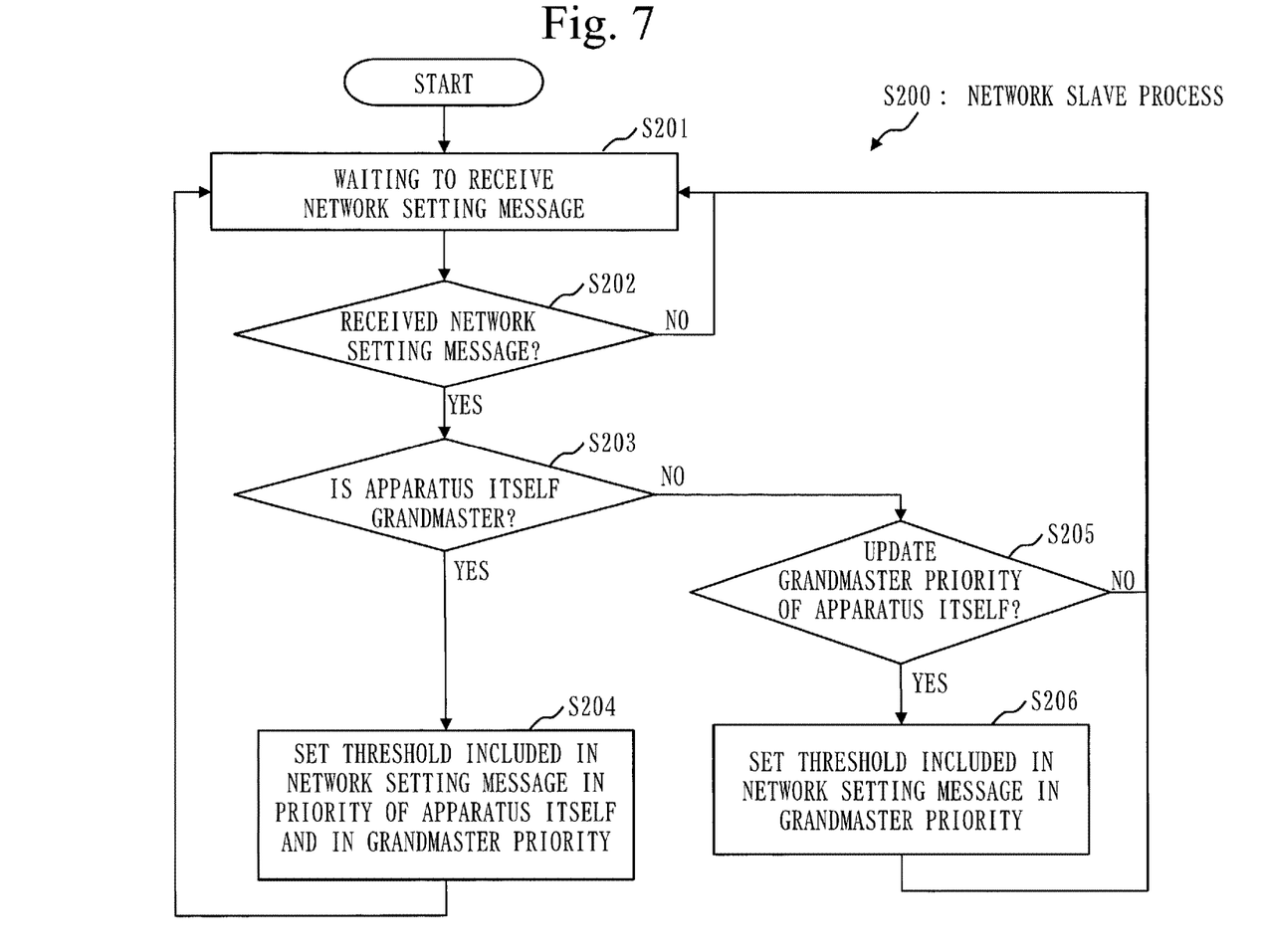
FIG. 7 is an operation flow diagram of when the communication apparatus other than the network management master received a network setting message according to Embodiment 1.

FIG. 7 is an operation flow diagram of when the communication apparatus 100 other than the network management master received the network setting message, according to the present embodiment. By using FIG. 7, the network slave process S200 when the communication apparatus 100 is other than the network management master will be described.

In step S201 and step S202, the communication apparatus 100 enters a waiting state until the network setting message is received. The communication apparatus 100 proceeds to step S203 when receiving the network setting message from another communication apparatus of the communication system 500.

In step S203, the grandmaster verification unit 120 verifies whether or not the communication apparatus 100 is the grandmaster. When the communication apparatus 100 is the grandmaster, the process proceeds to step S204. When the communication apparatus 100 is not the grandmaster, the process proceeds to step S205. The process to verify whether or not the communication apparatus 100 is the grandmaster is the same as step S106 in FIG. 5.

In step S204, the setting unit 130 sets in the apparatus priority 21, the threshold included in the network setting message and sets in the grandmaster priority 22 the threshold included in the network setting message. Specifically, the setting unit 130 raises a value of a grandmaster priority of the communication apparatus 100 to a value of a threshold in grandmaster priority information that is stored in the network setting message. After setting is completed, the setting unit 130 returns to waiting to receive the network setting message of step S201.

In the example in FIG. 4, the communication apparatus 1 is other than the network management master and is the grandmaster. And, the communication apparatus 2 that is the network management master sets in the network setting message NWConfig, 15 as the threshold of the priority of the grandmaster, and is transmitting the network setting message NWConfig to the communication apparatus 1 that is the grandmaster. When the network setting message NWConfig is received, the communication apparatus 1 raises the priority to 15.

In a case where the communication apparatus 100 is not the network management master and not the grandmaster, when the network setting message is received, the setting unit 130 may set in the grandmaster priority 22, a threshold included in the network setting message. This is because the grandmaster priority 22 is indicating the priority of the grandmaster of the communication system 500 as described above.

Specifically, in step S205, the setting unit 130 verifies whether or not to set in the grandmaster priority 22, the threshold included in the network setting message. That is, the setting unit 130 verifies whether or not to update the grandmaster priority 22. When the grandmaster priority 22 is to be updated, the process proceeds to step S206. When the grandmaster priority 22 is not to be updated, the process returns to step S201. Here, whether or not the communication apparatus that is the slave updates a grandmaster priority depends on the communication apparatus. Even when the communication apparatus that is the slave does not update the grandmaster priority, a problem would not occur as for a protocol. To raise, by the network setting message, the grandmaster priority that the communication apparatus that is not the grandmaster recognizes, however, can update the priority faster than by executing the BMCA again by the grandmaster that had the priority raised.

In step S206, the setting unit 130 sets in the grandmaster priority 22, the threshold included in the network setting message. After that, the process returns to step S201.

*Other Configurations*

In the present embodiment, the functions of the management verification unit 110, the grandmaster verification unit 120, the setting unit 130, and the mediation unit 140 are realized by software. As a variation, the functions of the management verification unit 110, the grandmaster verification unit 120, the setting unit 130, and the mediation unit 140 may be realized by hardware.

The communication apparatus 100 may include an electronic circuit in place of the processor 910 in FIG. 2 and FIG. 3. The electronic circuit is a dedicated electronic circuit to realize the functions of the management verification unit 110, the grandmaster verification unit 120, the setting unit 130, and the mediation unit 140.

The electronic circuit is, specifically, a single circuit, a composite circuit, a programmed processor, a parallel programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The functions of the management verification unit 110, the grandmaster verification unit 120, the setting unit 130, and the mediation unit 140 may be realized by one electronic circuit or may be realized by being distributed to a plurality of electronic circuits.

As another variation, a part of the functions of the management verification unit 110, the grandmaster verification unit 120, the setting unit 130, and the mediation unit 140 may be realized by the electronic circuit and the rest of the functions may be realized by software.

Each of the processor and the electronic circuit is also called a processing circuitry. That is, in the communication apparatus 100, the functions of the management verification unit 110, the grandmaster verification unit 120, the setting unit 130, and the mediation unit 140 are realized by the processing circuitry.

*Description of Effect of Embodiment*

The communication system 500 according to the present embodiment includes a setting function where the network management master makes the grandmaster raise the priority of the grandmaster to the value of the threshold. Consequently, according to the communication system 500 of the present embodiment, when a communication apparatus with a priority lower than the threshold newly enters, this communication apparatus is prevented from being switched to the grandmaster. According to the communication system 500 of the present embodiment, when a communication apparatus with a priority higher than or equal to the threshold newly enters, the communication system 500 allows the communication apparatus to switch to the grandmaster.

As described above, in the communication system 500 according to the present embodiment, when a communication apparatus with a priority lower than the threshold enters, the communication apparatus is not recognized as the grandmaster, and when a communication apparatus with a priority higher than or equal to the threshold enters, the communication apparatus that newly entered is recognized as the grandmaster.

Consequently, according to the communication system 500 of the present embodiment, the switch in the grandmasters are not performed until a certain level of priority, and when a communication apparatus with a high priority enters, synchronizing time with the communication apparatus can be done. Consequently, according to the communication system 500 of the present embodiment, an effect is provided where when a communication apparatus with a high priority enters, synchronizing time with the communication apparatus can be done while preventing a switch in the grandmasters that is unintentional.

In Embodiment 1 above, each unit of the communication apparatus is described as an independent functional block. The configuration of the communication apparatus, however, does not have to be in the configuration as the embodiment described above. The functional block of the communication apparatus may be in any configuration if the functions described in the embodiment described above can be realized. The communication apparatus may be a system configured of a plurality of apparatuses, not of one apparatus.

Of Embodiment 1, a plurality of parts may be combined and executed. Or, of this embodiment, one part may be executed. In addition, this embodiment may be combined and executed in any manner, either fully or partially.

That is, in Embodiment 1, a free combination of the embodiment, a variation of any element in the embodiment, or omitting of any element in the embodiment is possible.

The embodiment described above is an essentially preferred example, and is not intended to limit the scope of the present invention, the scope of application of the present invention, and the scope of use of the present invention. Various changes are possible to be made to the embodiment described above as needed.

REFERENCE SIGNS LIST

11: interrupt control unit; 12: transmission unit; 13: time division control unit; 14: receiving unit; 15: synchronization control unit; 16: data mediation unit; 17, 18: network interface; 21: apparatus priority; 22: grandmaster priority; 23: threshold; 100: communication apparatus; 110: management verification unit; 120: grandmaster verification unit; 130: setting unit; 140: mediation unit; 500, 501: communication system; 900: microcomputer; 910: processor; 921: memory; 922: auxiliary storage device; 930: input interface; 940: output interface; 950: communication control unit; 961, 962: network port; 970: system clock; Announce: grandmaster mediation message; NWConfig: network setting message; Sync: synchronization message; GM: grandmaster; NWM: network management master.

The invention claimed is:

1. A communication apparatus included in a communication system, the communication system having a plurality of communication apparatuses, where any one of the plurality of communication apparatuses is set as a grandmaster that is to be a standard of time of the plurality of communication apparatuses, and any one of the plurality of communication apparatuses is set as a network management master that sets a priority of the grandmaster, the communication apparatus comprising:

processing circuitry to:
  verify whether or not the communication apparatus is the network management master,
  verify whether or not the communication apparatus is the grandmaster, and
  when the communication apparatus is the network management master and the grandmaster, set in a priority of the communication apparatus a threshold indicating that a priority is higher than a priority of a current grandmaster, and when the communication apparatus is the network management master and not the grandmaster, transmit a network setting message that includes the threshold to be set for a priority of the grandmaster.

2. The communication apparatus according to claim 1, wherein the processing circuitry
  when the network setting message is received from another one of the plurality of communication apparatuses of the communication system, verifies whether or not the communication apparatus is the grandmaster, and
  when the communication apparatus is the grandmaster, sets the threshold included in the network setting message in the priority of the communication apparatus.

3. The communication apparatus according to claim 2 wherein the processing circuitry stores in a memory, the priority of the communication apparatus as an apparatus priority, and stores in the memory, the priority of the grandmaster as a grandmaster priority, and
  wherein the processing circuitry, when the communication apparatus is the grandmaster, sets in the apparatus priority, the threshold included in the network setting message, and sets in the grandmaster priority, the threshold included in the network setting message.

4. The communication apparatus according to claim 3, wherein the processing circuitry when the communication apparatus is not the grandmaster, verifies whether or not to set in the grandmaster priority, the threshold included in the network setting message, and when verified that the threshold is to be set, sets in the grandmaster priority, the threshold included in the network setting message.

5. The communication apparatus according to claim 3 comprising:
  processing circuitry to:
    execute grandmaster mediation by transmitting and receiving a grandmaster mediation message for selecting the grandmaster, the grandmaster mediation message including a priority of a communication apparatus that is to be a candidate for the grandmaster, wherein the processing circuitry
    when receiving the grandmaster mediation message, performs the grandmaster mediation by executing a grandmaster priority comparison process that compares the priority included in the grandmaster mediation message with the grandmaster priority.

6. The communication apparatus according to claim 4 comprising:
  processing circuitry to:
    execute grandmaster mediation by transmitting and receiving a grandmaster mediation message for selecting the grandmaster, the grandmaster mediation message including a priority of a communication apparatus that is to be a candidate for the grandmaster, wherein the processing circuitry
    when receiving the grandmaster mediation message, performs the grandmaster mediation by executing a grandmaster priority comparison process that compares the priority included in the grandmaster mediation message with the grandmaster priority.

7. A communication system comprising:
  a plurality of communication apparatuses, wherein
  any one of the plurality of communication apparatuses is set as a grandmaster that is to be a standard of time of the plurality of communication apparatuses, and
  any one of the plurality of communication apparatuses is set as a network management master that sets a priority of the grandmaster, wherein
  each of the plurality of communication apparatuses includes processing circuitry
    to verify whether or not the communication apparatus is the network management master,
    to verify whether or not the communication apparatus is the grandmaster, and
    when the communication apparatus is the network management master and the grandmaster, to set in a priority of the communication apparatus a threshold indicating that a priority is higher than a priority of a current grandmaster, and when the communication apparatus is the network management master and not the grandmaster, to transmit a network setting message that includes the threshold to be set for a priority of another communication apparatus that is the grandmaster.

8. A communication method of a communication apparatus included in a communication system, the communication system having a plurality of communication apparatuses, where any one of the plurality of communication apparatuses is set as a grandmaster that is to be a standard of time of the plurality of communication apparatuses, and any of the plurality of communication apparatuses is set as a network management master that sets a priority of the grandmaster, the communication method comprising:
  verifying whether or not the communication apparatus is the network management master;
  verifying whether or not the communication apparatus is the grandmaster; and
  when the communication apparatus is the network management master and the grandmaster, setting in a priority of the communication apparatus a threshold indicating that a priority is higher than a priority of a current grandmaster, and when the communication apparatus is the network management master and not the grandmaster, transmitting a network setting message that includes the threshold to be set for a priority of the grandmaster.

9. A non-transitory computer readable medium storing a communication program of a communication apparatus included in a communication system, the communication system having a plurality of communication apparatuses, where any one of the plurality of communication apparatuses is set as a grandmaster that is to be a standard of time of the plurality of communication apparatuses, and any one of the plurality of communication apparatuses is set as a network management master that sets a priority of the grandmaster, the communication program causing the communication apparatus that is a computer to execute:
  a management verification process to verify whether or not the communication apparatus is the network management master;
  a grandmaster verification process to verify whether or not the communication apparatus is the grandmaster; and a setting process, when the communication apparatus is the network management master and the grandmaster, to set in a priority of the communication apparatus a threshold indicating that a priority is higher than a priority of a current grandmaster, and when the communication apparatus is the network management master and not the grandmaster, to transmit a network setting message that includes the threshold to be set for a priority of the grandmaster.

\* \* \* \* \*